United States Patent
Felty

(10) Patent No.: US 6,783,264 B2
(45) Date of Patent: Aug. 31, 2004

(54) SURFACE-MOUNTED, BILLET-FORMED BALL-TYPE HEADLIGHT MOUNT

(76) Inventor: Joel R. Felty, 805 W. Hillcrest Blvd., Monrovia, CA (US) 91016

( * ) Notice: Subject to any disclaimer, the term of this patent is extended or adjusted under 35 U.S.C. 154(b) by 0 days.

(21) Appl. No.: 10/085,680

(22) Filed: Feb. 26, 2002

(65) Prior Publication Data

US 2003/0161156 A1 Aug. 28, 2003

(51) Int. Cl.[7] ............................................. F21V 21/30
(52) U.S. Cl. ...................... 362/371; 362/421; 362/427; 362/528
(58) Field of Search ................................ 362/285, 287, 362/368, 371, 382, 418, 419, 421, 427, 515, 528, 549; 248/181.1, 288.31, 288.51, 481, 482; 403/122

(56) References Cited

U.S. PATENT DOCUMENTS

| | | | | |
|---|---|---|---|---|
| 658,911 A | * | 10/1900 | Hall | 248/181.1 |
| 929,463 A | * | 7/1909 | McGavin | 362/421 |
| 1,514,867 A | * | 11/1924 | Solosabal et al. | 362/549 |
| 1,571,709 A | * | 2/1926 | Clarke | 362/528 |
| 1,612,806 A | * | 1/1927 | Gehersky | 362/528 |
| 1,631,480 A | * | 6/1927 | Freund | 362/421 |
| 4,433,854 A | * | 2/1984 | Smith | 280/511 |
| 5,690,419 A | * | 11/1997 | Siems | 362/269 |

FOREIGN PATENT DOCUMENTS

| DE | 3603981 A1 | * | 7/1986 | 362/528 |
|---|---|---|---|---|

* cited by examiner

*Primary Examiner*—Alan Cariaso
(74) *Attorney, Agent, or Firm*—Steins & Associates, P.C.

(57) ABSTRACT

A Surface-Mounted, Billet-Formed Ball-Type Headlight Mount is disclosed. Also disclosed is a headlight mount that includes a ball dome member that attaches to the outside surface of the headlight housing. The mount further includes a plurality of attaching bolts extending outward from the inside of the housing to engage threaded apertures formed in an annular face. Furthermore, the mount assembly includes a carriage bolt having a flat-sided head.

15 Claims, 6 Drawing Sheets

US 6,783,264 B2

SURFACE-MOUNTED, BILLET-FORMED BALL-TYPE HEADLIGHT MOUNT

BACKGROUND OF THE INVENTION

1. Field of the Invention

This invention relates generally to vehicle lighting devices and, more specifically, to a Surface-Mounted, Billet-Formed Ball-Type Headlight Mount.

2. Description of Related Art

Ball-mounted headlights were the standard type of headlight in most pre-1936 American cars. This design is also employed in one or more current models of Commercial Semi-trailer Tractor Trucks. The conventional design for these assemblies is depicted in FIG. 1. FIG. 1 is a perspective view of a conventional ball-mounted headlight assembly 10. The major components of the conventional assembly 10 consist of a metal housing 12, inside of which is located a light or lamp 14 (e.g. sealed beam type). The assembly 10 is attached to the main body or frame of the vehicle by engagement between a threaded stud 18 and nut 22 (i.e. through a hole in the body or frame of the vehicle). The stud 18 extends downwardly (in this view) from a ball dome 16, and through an aperture (not shown) formed in a socket ring 20 cooperatively formed to accept the ball dome 16. The conventional ball dome 16 is formed from a piece of sheet metal, and is attached to the housing 12 by a plurality of rivets 17 (or other suitable fasteners). It is the elimination of these visible rivets 17 that is one of the objectives of the present invention. If we turn to FIGS. 2A and 2B, we can examine the specifics design aspects of the present invention.

FIG. 2A is a perspective view of a conventional ball dome assembly 27 used in the assembly 10 of FIG. 1. As shown, the threaded stud 18 protrudes through a slot 26 formed in the ball dome portion 16 of the ball dome assembly 27. The ball dome portion 16 is raised, thereby forming a hollow cavity extending from the base 24 of the ball dome assembly 27. Disposed on the base 24 are typically a plurality of apertures 28 for accepting rivets or other suitable fasteners therethrough (see FIG. 1). It should be appreciated that the slot 26 is slot-shaped such that the threaded stud 18 can be positioned along the length of the slot 26 for the purpose of angularly adjusting the aim of the headlight lamp.

FIG. 2B is a perspective view of a conventional carriage bolt 19 used in the assembly 10 of FIG. 1. As can be seen, the threaded stud 18 extends from a rectangular protrusion 23 of a round head 21 of the carriage bolt 19. The purpose of the round head 21 is to prevent the carriage bolt 19 from slipping through the slot 26 in the ball dome portion 16. The purpose of the rectangular protrusion 23 is to cooperate with the sides of the slot 26 to prevent the threaded stud 18 from rotating when a nut (see FIG. 1) is tightened on its end. If we now turn to FIG. 3, we can examine how the ball dome assembly 27 attaches to the conventional housing.

FIG. 3 is a front view of the housing 12 of the assembly of FIG. 1. The inner surface 31 of the housing 12 defines an internal housing chamber 34. It is within this chamber 34 that the lamp (see FIG. 1) resides when the assembly is assembled. Penetrating the inner surface 31 is a dome aperture 30 and a plurality of rivet apertures 32 disbursed therearound. As should be apparent having reviewed FIGS. 2 and 3, the conventional ball dome portion (see FIG. 2A) protrudes through the dome aperture 30, while the base of the ball dome assembly (see FIG. 2A) remains inside the internal housing chamber 34 (against the inner surface 31).

The apertures (see FIG. 2A) disbursed on the base (see FIG. 2A) are located thereon to cooperate with the rivet apertures 32 disbursed on the housing 31, such that rivets (or other suitable fasteners) can be attached through the rivet apertures 23 and apertures formed in the base (see FIG. 2A).

The problem with this prior design is one of functionality and aesthetics. First, manufacturing and strength of materials limitations limits the maximum feasible height of the ball dome using this design; because the height is limited, so therefore is the range of adjustment of the light. Second, the fasteners necessarily inserted through holes in the housing create an aesthetically unpleasing outer surface on the housing assembly. What is needed, therefore, is a ball dome design that potentially has a taller profile than the conventional dome, and further one where there is no need for rivet heads or other fasteners to be visible from the outside of the assembly.

SUMMARY OF THE INVENTION

In light of the aforementioned problems associated with the prior devices, it is an object of the present invention to provide a Surface-Mounted, Billet-Formed Ball-Type Headlight Mount. The headlight mount should include a ball dome member that attaches to the outside surface of the headlight housing. The mount should further include a plurality of attaching bolts extending outward from the inside of the housing to engage threaded apertures formed in an annular face. It is a further object that the mount include a carriage bolt having a flat-sided head.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Improved Glove Dispenser.

Figure 4A:
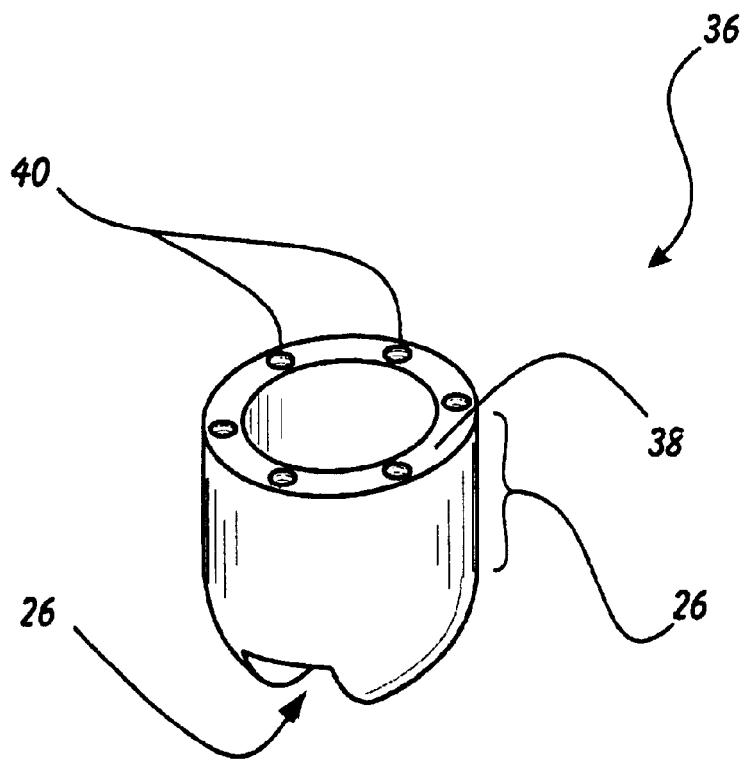
FIGS. 4A and 4B are perspective views of embodiments of the billet-formed ball dome and modified carriage bolt of the present invention.
Figure 4B:
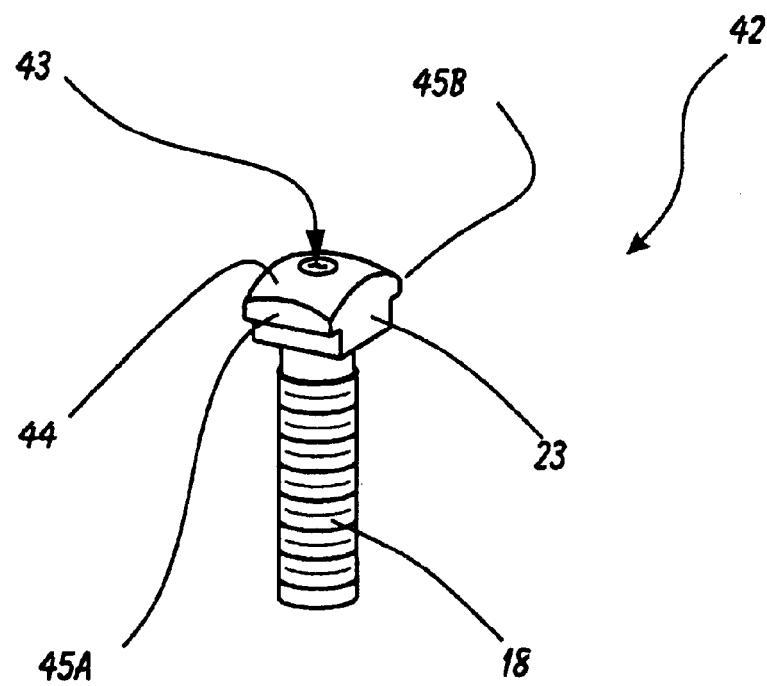

The present invention can best be understood by initial consideration of FIGS. 4A and 4B. FIGS. 4A and 4B are perspective views of embodiments of the billet-formed ball dome 36 and modified carriage bolt 42 of the present invention. As shown in FIG. 4A, this billet-formed ball dome 36 can be machined from a solid billet of material. Unlike the prior ball domes, this dome 36 does not include a base portion; it is designed to actually mount to the surface of the light housing, as discussed below in connection with FIGS. 5 and 6.

Cut generally in the center of the dome 36 is a slot 26; as discussed in the background section of this writing, this billet-formed dome 36 may have an elongated cylindrical portion 37 (as compared to the conventional ball dome assembly), such that the height of the ball dome 36 is greater than for the conventional design. Where an elongated cylindrical portion 37 is included, it is now feasible to also employ an extra-long slot 26; the combination of a taller ball dome 36 and a longer slot 26 will result in additional angular adjustment in the headlight assembly.

"As shown, the billet-formed bell dome 36 is further defined by an annular face 38. This face 38 will typically have a surface contour to match the contour of the outer surface of the light housing (see FIG. 5) area to which the ball dome 36 attaches. The result of this form-fitted contour is to provide a clean mating surface between the ball dome 36 and the outer surface of the housing (not shown). Dispersed around the annular race 38 are a plurality of threaded bores 40; these bores 40 are configured to engage bolts or screws that at, threaded into the bores 40 outwardly from the inside of the light housing (see FIG. 5)."

Figure 1:
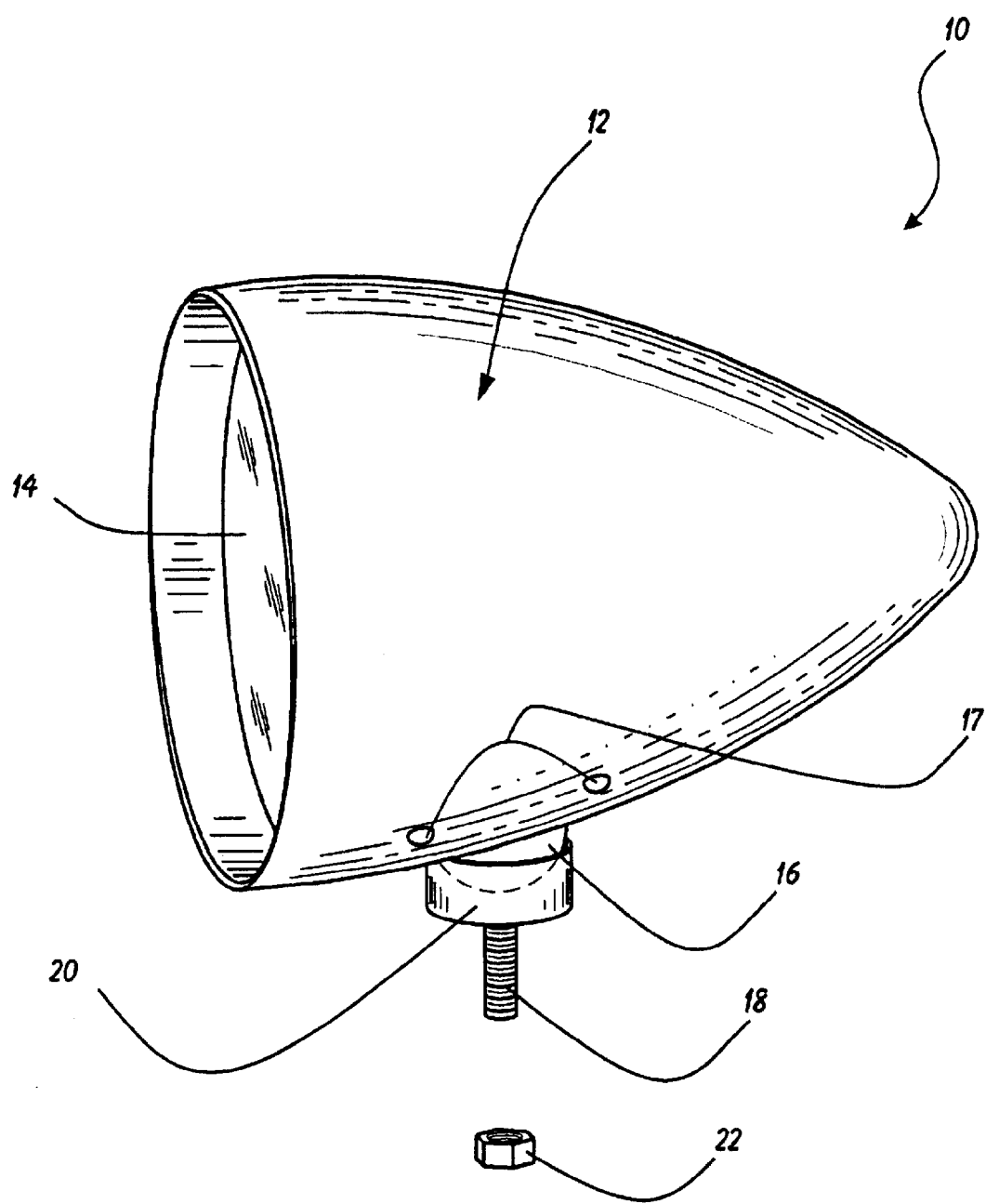
FIG. 1 is a perspective view of a conventional ball-mounted headlight assembly.
Figure 2A:
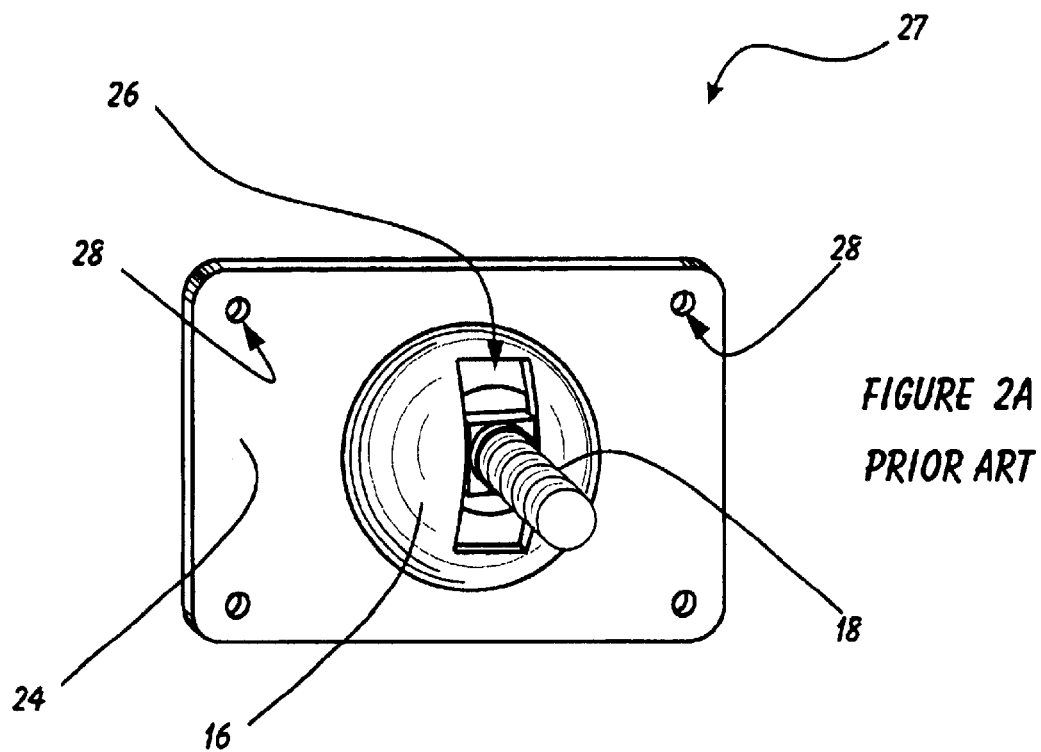
FIGS. 2A and 2B are perspective views of a conventional ball dome assembly and carriage bolt used in the assembly of FIG. 1.
Figure 2B:
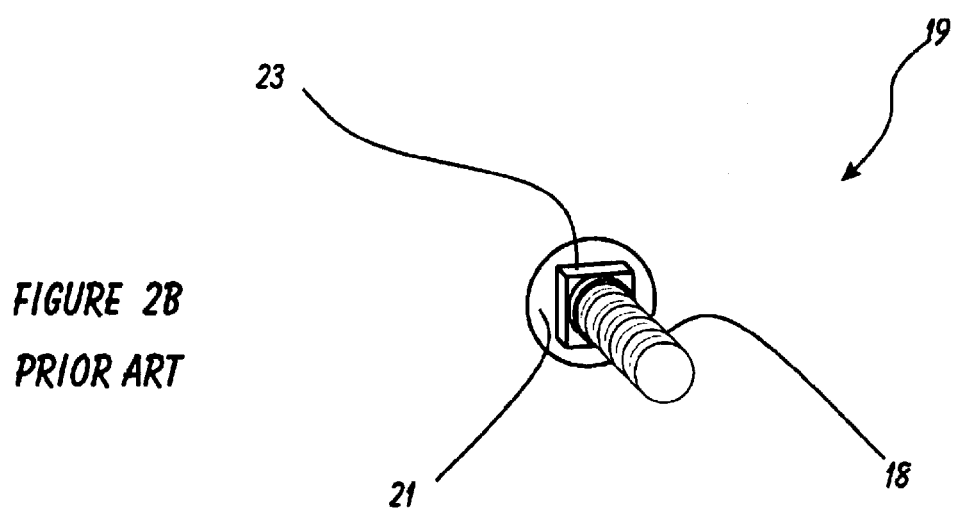
Figure 3:
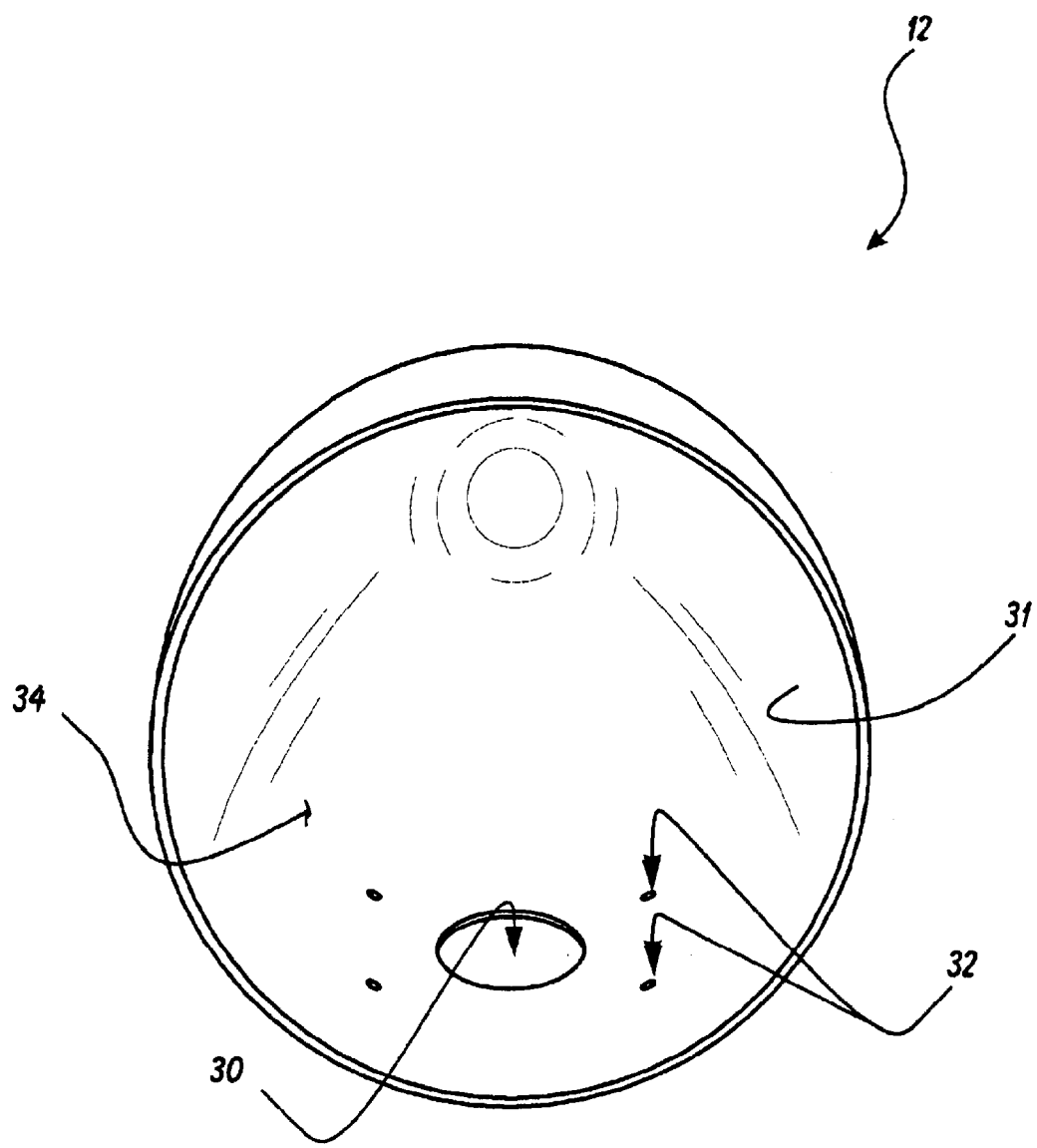
FIG. 3 is a front view of the housing of the assembly of FIG. 1.

FIG. 4B depicts a modified carriage bolt 42 usable in the present invention. There are several similarities between the modified carriage bolt 42 and the conventional carriage bolt (see FIG. 2B), namely, the threaded stud 18, the rectangular portion 23, and the wiring hole 43 (although this feature was not discussed in FIG. 2B). What is different in this bolt 42 as compared with the prior bolt, is the shape of the head; in this embodiment, the a flat-sided head 44 is used. The benefit of the flat-sided head 44 is that it will function to retain the bolt 42 within the slot 26 when the head 44 is turned such that the long ends 45A and 45B are transverse to the slot (see FIG. 4A). When the bolt 42 is turned ninety (90) degrees, however, the long ends 45A and 45B will align with the slot (see FIG. 4A), and the head 44 of the bolt 42 will be permitted to slip through the slot (see FIG. 4A). The practical effect of this functionality is that the bolt 42 can be inserted and removed from outside of the ball dome (see FIG. 4A), rather than needing to be inserted from the inside of the light housing (see FIGS. 2 and 3); the bolt 42 can be installed and/or replaced on the light housing (see FIG. 5) without the need to remove the lamp (see FIG. 6) from inside the housing. If we now turn to FIG. 5, we can examine how the device of the present invention is assembled.

Figure 5:
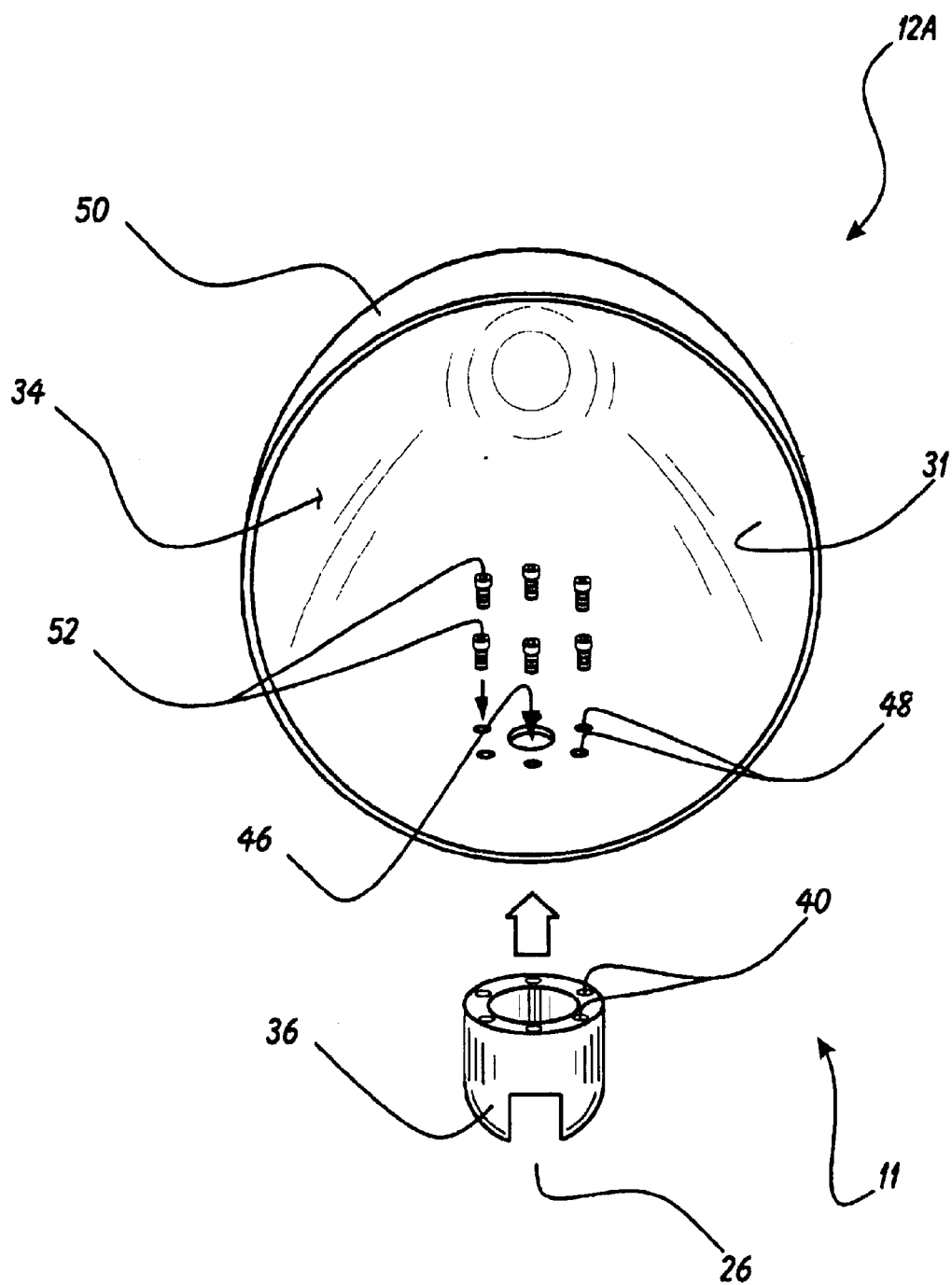
FIG. 5 is a partially exploded front view of the headlight assembly of the present invention.

FIG. 5 is a partially exploded front view of the headlight assembly 11 of the present invention. As shown, the billet-formed ball dome 36 mounts to the outer surface 50 of the housing 12A. To attach the dome 36, it is placed against the outer surface 50, such that the threaded bores 40 are aligned with the corresponding mounting bolt apertures 48 formed in the inner surface 31 of the housing 12A. A corresponding number of mounting screws or bolts 52 are then inserted through the mounting bolt apertures 48 and then threadedly engaged with the threaded bores 40 in the dome 36. Also penetrating the housing 12A is a wiring aperture 46; the wiring aperture 46 is provided to permit the electrical wiring to pass through the dome 36 and into the housing interior 34. In some embodiments, a rubber grommet (not shown) might be used to create a substantially liquid-tight seal between the wiring (not shown), the wiring aperture, and the grommet (not shown). Furthermore, the grommet (not shown) will prevent chafing between the wiring (not shown) and the metal housing 12A; this serves to prevent electrical shorting and electrical failure. If we finally turn to FIG. 6, we can examine the improved appearance of the design of this assembly.

Figure 6:
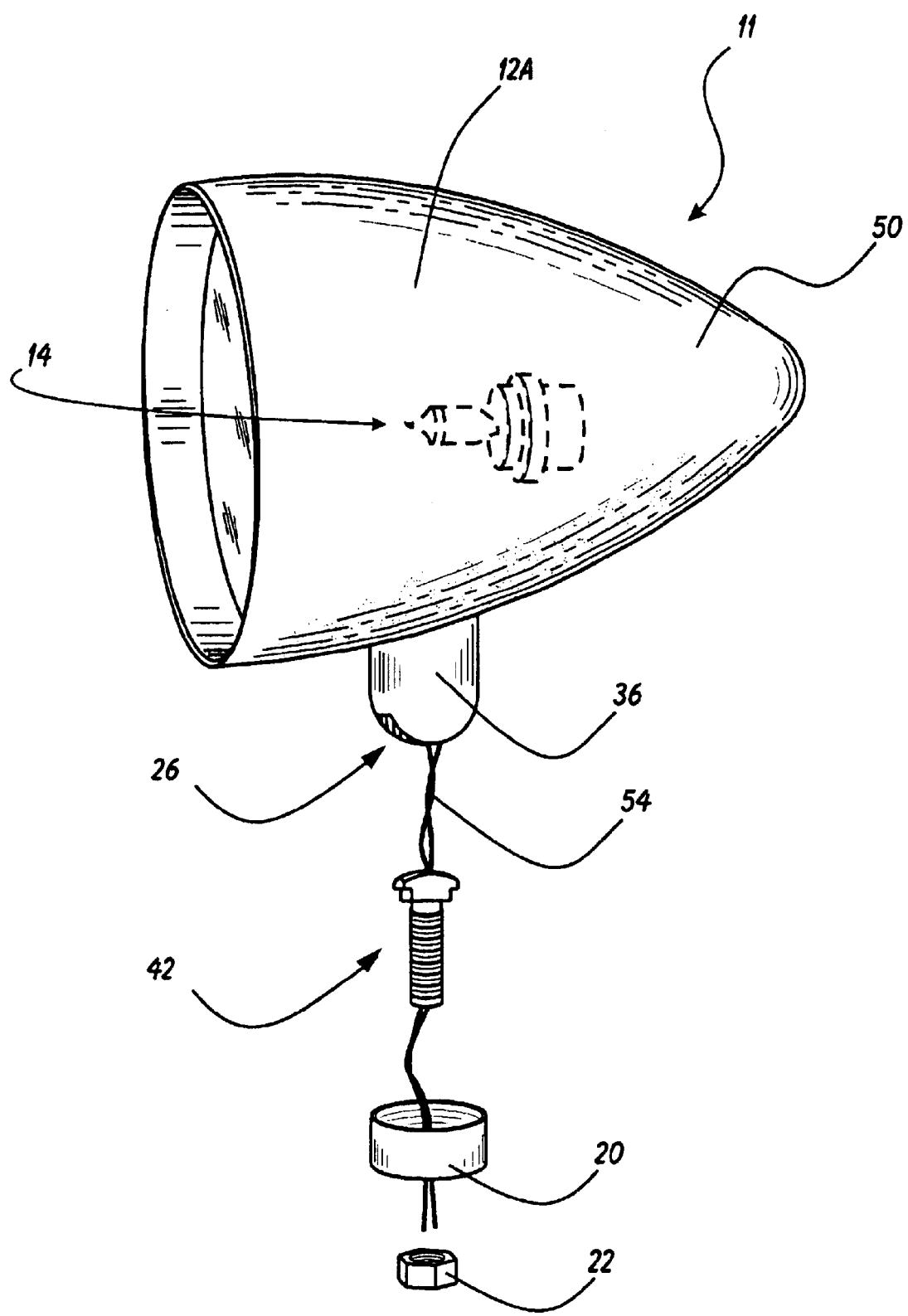
FIG. 6 is a perspective view of the headlight assembly of FIGS. 4 and 5.

FIG. 6 is a perspective view of the headlight assembly 11 of FIGS. 4 and 5. As can be seen, the billet-formed dome 36 mounts to the outer surface 50 of the housing 12A, without the need for externally-protruding fasteners. The result is a very sleek, aesthetically pleasing shape. Furthermore, and as discussed earlier, once the dome 36 is attached to the housing 12A and the wiring 54 is threaded out through the slot 26 and through the modified carriage bolt 42, the modified carriage bolt 42 can be inserted into the slot 26 and then twisted ninety (90) degrees until the long ends (see FIG. 4B) cooperate with the edges of the slot 26 to retain the head of the carriage bolt 42 therein. Next, the carriage bolt 42 is inserted through an aperture formed in the socket ring 20, and the entire assembly 11 is attached to the vehicle body or frame (not shown) via a nut 22 or other suitable fastener.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A headlight housing assembly comprising:
    a housing defined by an inner surface and an outer surface and an inner chamber;
    a lamp attached to said housing and resident inside said housing inner chamber;
    a ball dome member attached to said outer surface such that said entire ball dome member is external to said inner chamber, said ball dome member is further defined by a cylindrical portion, said cylindrical portion terminating in a dome portion at one end and in an annular face at another end, said annular face forming a ring-shaped surface forming a centralized opening into said ball dome member, said annular face defined by one or more threaded bores formed therethrough, each said bore being adjacent to and separate from said centralized opening.

2. The assembly of claim 1, wherein said ball dome member is further defined by a slot formed in said dome portion.

3. The assembly of claim 2, wherein said housing further includes at least one bolt aperture formed therethrough, and wherein said assembly further comprises a mounting bolt inserted through each said bolt aperture to pass from said interior chamber out through said bolt aperture and into a corresponding said threaded bore formed in said ball dome member, whereby each said mounting bolt is in threaded engagement with one said threaded bore to attach said ball dome to said outer surface of said housing.

4. The assembly of claim 3, further defined by a carriage bolt, said carriage bolt defined by a threaded shaft portion transitioning into a generally rectangular portion, said generally rectangular portion configured to cooperate with said slot to prevent said carriage bolt from rotating when said generally rectangular portion is engaging said slot, said generally rectangular portion transitioning into a flat-sided head.

5. The assembly of claim 4, wherein said flat-sided head comprises two opposing sides in spaced relation that is substantially identical to two corresponding opposing sides of said generally rectangular portion, said flat-sided head further defined by a pair of opposing long ends for engagement with said dome portion adjacent to said slot.

6. The assembly of claim 5, wherein:
   said housing is defined by at least four said bolt apertures in spaced relation to describe a generally circular shape;
   said dome member comprises four said threaded bores dispersed on said annular face to correspond with said bolt apertures; and
   said assembly further comprises four said mounting bolts inserted through said bolt apertures and into threaded engagement with said threaded bores.

7. A ball dome assembly for attachment to the outer surface of a headlight housing, said housing having an inner chamber within which a lamp resides, the assembly comprising:
   a ball dome forming a internal cavity separate from said inner chamber, said ball dome defined by a ring-shaped annular face forming a bore into said internal cavity, said ball dome attached to the outer surface of the housing with said annular face substantially in contact with said outer surface, said ball dome is further defined by a plurality of threaded a bores therein, said threaded bores opening on said annular face in generally spaced relation yet not opening on said internal cavity.

8. The assembly of claim 7, wherein said ball dome member is further defined by a slot formed in said dome portion.

9. The assembly of claim 8, further defined by a plurality of mounting bolts, each said mounting bolt in threaded engagement with one said threaded bore.

10. The assembly of claim 9, further defined by a carriage bolt, said carriage bolt defined by a threaded shaft portion transitioning into a generally rectangular portion, said generally rectangular portion configured to cooperate with said slot to prevent said carriage bolt from rotating when said generally rectangular portion is engaging said slot, said generally rectangular portion transitioning into a flat-sided head.

11. The assembly of claim 10, wherein said flat-sided head comprises two opposing sides in spaced relation that is substantially identical to two corresponding opposing sides of said generally rectangular portion, said flat-sided head further defined by a pair of opposing long ends for engagement with said dome portion adjacent to said slot.

12. A headlight housing and ball dome assembly combination, comprising:
   a housing defined by an inner chamber containing a lamp, and an outer surface;
   a ball dome member attached to said outer surface and defined by a generally hollow cylindrical shape forming an annular face at one end and a dome-shaped portion at its other end, said annular face defining a ring-shaped face and a hollow center; and
   at least four mounting bolts penetrating said housing from said inner chamber and each said mounting bolt threadedly engaging a corresponding threaded bore formed in said ring-shaped face.

13. The combination of claim 13, wherein said ball dome member is further defined by a slot formed in said dome-shaped portion.

14. The combination of claim 13, further defined by a carriage bolt, said carriage bolt defined by a threaded shaft portion transitioning into a generally rectangular portion, said generally rectangular portion configured to cooperate with said slot to prevent said carriage bolt from rotating when said generally rectangular portion is engaging said slot, said generally rectangular portion transitioning into a flat-sided head.

15. The combination of claim 14, wherein said flat-sided head comprises two opposing sides in spaced relation that is substantially identical to two corresponding opposing sides of said generally rectangular portion, said flat-sided head further defined by a pair of opposing long ends for engagement with said dome portion adjacent to said slot.

* * * * *